United States Patent
Taneja et al.

(10) Patent No.: US 11,709,694 B2
(45) Date of Patent: Jul. 25, 2023

(54) SUPPORT OF VIRTUAL NETWORK AND NON-VIRTUAL NETWORK CONNECTIVITY ON THE SAME VIRTUAL MACHINE

(71) Applicant: Microsoft Technology Licensing, LLC, Redmond, WA (US)

(72) Inventors: Vishal Taneja, Sammamish, WA (US); Abhishek Shukla, Redmond, WA (US); Parag Sharma, Issaquah, WA (US); Xinyan Zan, Sammamish, WA (US); Kaihua Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 679 days.

(21) Appl. No.: 16/664,552

(22) Filed: Oct. 25, 2019

(65) Prior Publication Data
US 2021/0019167 A1    Jan. 21, 2021

Related U.S. Application Data

(60) Provisional application No. 62/874,190, filed on Jul. 15, 2019.

(51) Int. Cl.
*G06F 9/455* (2018.01)
*H04L 12/46* (2006.01)
(Continued)

(52) U.S. Cl.
CPC ...... *G06F 9/45558* (2013.01); *H04L 12/4633* (2013.01); *H04L 12/4641* (2013.01);
(Continued)

(58) Field of Classification Search
CPC ............... G06F 9/45558; G06F 9/5077; G06F 2009/4557; G06F 2009/45595;
(Continued)

(56) References Cited

U.S. PATENT DOCUMENTS 10,110,483 B2 * 10/2018 Behringer ............... H04L 45/64
10,476,809 B1 * 11/2019 Daniel ................. G06F 9/45558
(Continued)

OTHER PUBLICATIONS

"International Search Report and Written Opinion Issued in PCT Application No. PCT/US20/035792", dated Sep. 15, 2020, 15 Pages.

*Primary Examiner* — Lewis A Bullock, Jr.
*Assistant Examiner* — Kevin X Lu

(57) ABSTRACT

A hybrid state for a virtual machine (VM) in a cloud computing system enables a VM to communicate with other VMs that belong to a virtual network (VNET VMs) while maintaining connectivity with other VMs that do not belong to the virtual network (non-VNET VMs). A non-VNET VM can be transitioned to a hybrid VM that operates in a hybrid state. The hybrid VM can be assigned a private virtual IP address (VNET address) for communication with other VNET VMs. The hybrid VM can continue to use a physical IP address to communicate with other non-VNET VMs. In this way, the hybrid VM is able to maintain connectivity with other non-VNET VMs during and after migration to the VNET. A network stack can be configured to process data packets that are destined for non-VNET VMs differently from data packets that are destined for VNET VMs.

19 Claims, 10 Drawing Sheets

(51) Int. Cl.
 *H04L 45/74* (2022.01)
 *H04L 61/5007* (2022.01)
(52) U.S. Cl.
 CPC .......... *H04L 45/74* (2013.01); *H04L 61/5007* (2022.05); *G06F 2009/4557* (2013.01); *G06F 2009/45595* (2013.01)
(58) Field of Classification Search
 CPC . H04L 12/4633; H04L 12/4641; H04L 45/74; H04L 61/2007; H04L 61/2038; H04L 41/0813
 See application file for complete search history.

(56) References Cited

U.S. PATENT DOCUMENTS

| | | | |
|---|---|---|---|
| 11,308,281 B1* | 4/2022 | Craft | G06F 40/284 |
| 2007/0079307 A1 | 4/2007 | Dhawan et al. | |
| 2013/0058346 A1 | 3/2013 | Sridharan et al. | |
| 2017/0142234 A1 | 5/2017 | Bansal et al. | |
| 2017/0366455 A1* | 12/2017 | Pongracz | H04L 69/324 |
| 2018/0176130 A1* | 6/2018 | Banerjee | H04L 61/2557 |
| 2018/0241809 A1* | 8/2018 | Gandhi | G06F 15/17331 |
| 2018/0309718 A1* | 10/2018 | Zuo | H04L 61/2521 |
| 2019/0158466 A1 | 5/2019 | Deb et al. | |
| 2019/0163538 A1* | 5/2019 | Klein | G06F 9/5077 |
| 2019/0319847 A1* | 10/2019 | Nahar | G06F 9/45558 |
| 2019/0319914 A1* | 10/2019 | Petersen | H04L 61/103 |
| 2020/0092138 A1* | 3/2020 | Tillotson | H04L 12/4633 |
| 2020/0314006 A1* | 10/2020 | Mackie | H04L 45/64 |

\* cited by examiner

SUPPORT OF VIRTUAL NETWORK AND NON-VIRTUAL NETWORK CONNECTIVITY ON THE SAME VIRTUAL MACHINE

CROSS-REFERENCE TO RELATED APPLICATIONS

This application is related to and claims the benefit of U.S. Provisional Patent Application Ser. No. 62/874,190, filed Jul. 15, 2019, titled "SUPPORT OF VIRTUAL NETWORK AND NON-VIRTUAL NETWORK CONNECTIVITY ON THE SAME VIRTUAL MACHINE." The aforementioned application is expressly incorporated herein by reference in its entirety

BACKGROUND

Cloud computing is the delivery of computing services (e.g., servers, storage, databases, networking, software, analytics) over the Internet. Many different types of services may be provided by a cloud computing system, including services based on a software as a service (SaaS) model, services based on a platform as a service (PaaS) model, and services based on infrastructure as a service (IaaS) model.

Broadly speaking, a cloud computing system includes two sections, a front end and a back end, that are in electronic communication with one another via the Internet. The front end includes the interface that users encounter through a client device. The back end includes the resources that deliver cloud-computing services, including processors, memory, storage, and networking hardware. The back end of a cloud computing system typically includes one or more data centers, which may be located in different geographical areas. Each data center typically includes a large number (e.g., hundreds or thousands) of computing devices, which may be referred to as host machines.

At least some of the services that are offered by a cloud computing service provider may utilize virtualization technologies that allow computing resources to be shared by multiple users. For example, virtualization technologies allow a single physical computing device to be shared among multiple users by providing each user with one or more virtual machines hosted by the single physical computing machine. Each such virtual machine may act as a distinct logical computing system, and the various virtual machines may be isolated from one another. As another example, virtualization technologies allow data storage hardware to be shared among multiple users by providing each user with a virtual data store. Each such virtual data store may act as a distinct logical data store, and the various virtual data stores may be isolated from one another.

Virtualization technologies may also be used in the context of computer networking. Network virtualization involves combining hardware and software network resources and network functionality into a software-based administrative entity, which may be referred to as a virtual network (VNET). A cloud computing service provider may enable users (e.g., customers) to create VNETs within a cloud computing system. The use of network virtualization technologies in the context of a cloud computing environment is sometimes referred to as software-defined networking.

Resources may be assigned to VNETs. In this context, the term "resource" may refer to any item that is capable of being managed by a cloud computing system. Some examples of resources include virtual machines, virtual data stores, databases, and web applications. The resources within a VNET may communicate with each other and with other entities that are accessible via the Internet.

Virtual machines (VMs) that are assigned to VNETs may be referred to herein as "VNET VMs." Virtual machines that are not assigned to VNETs may be referred to herein as "non-VNET VMs." In other words, a non-VNET VM has not been assigned to a VNET, whereas a VNET VM has been assigned to a VNET. Generally speaking, VNET VMs are able to communicate with other VNET VMs, and non-VNET VMs are able to communicate with other non-VNET VMs. Currently, however, VNET VMs are unable to communicate directly with non-VNET VMs (and vice versa). Benefits may be realized by techniques that facilitate such communication.

SUMMARY

In accordance with one aspect of the present disclosure, a method is disclosed that includes migrating a virtual machine to a virtual network (VNET). The virtual machine is one of a plurality of non-VNET virtual machines that are deployed in a cloud computing system. The virtual machine is associated with a physical internet protocol (IP) address. The method also includes assigning a VNET address to the virtual machine and causing the virtual machine to operate in a hybrid state. In the hybrid state the virtual machine uses the physical IP address to communicate with other non-VNET virtual machines. In the hybrid state the virtual machine uses the VNET address to communicate with other VNET virtual machines. The method also includes providing a network stack on a host machine with a first packet processing rule set and a second packet processing rule set. The virtual machine runs on the host machine. The first packet processing rule set is configured to process first data packets corresponding to a first address space that has been defined for the virtual network. The second packet processing rule set is configured to process second data packets corresponding to a second address space that is distinct from the first address space and that does not overlap with the first address space.

The migration of the virtual machine to the VNET may occur in such a way that the virtual machine does not lose connectivity with the other non-VNET virtual machines as the virtual machine is migrated to the virtual network.

The first packet processing rule set may include encapsulation rules that specify how encapsulation should be performed on the first data packets. The second packet processing rule set may permit the second data packets to be transmitted without encapsulation.

The method may further include migrating the plurality of non-VNET virtual machines to the virtual network and deploying a plurality of pure VNET virtual machines within the virtual network.

In accordance with another aspect of the present disclosure, a system is disclosed that includes one or more processors, memory in electronic communication with the one or more processors, and instructions stored in the memory. The instructions are executable by the one or more processors to create a virtual network (VNET), migrate a non-VNET virtual machine to the VNET, and cause the non-VNET virtual machine to transition to a hybrid virtual machine that operates in a hybrid state. The hybrid virtual machine has both a physical internet protocol (IP) address and a VNET address. The hybrid virtual machine is configured to use the physical IP address to communicate with other non-VNET virtual machines. The hybrid virtual machine is configured to use the VNET address to communicate with other VNET virtual machines. The instructions are also executable by the one or more processors to provide a network stack with a first packet processing rule set and a second packet processing rule set. The first packet processing rule set is configured to process first data packets corresponding to a first address space that has been defined for the virtual network. The second packet processing rule set is configured to process second data packets corresponding to a second address space that is distinct from the first address space and that does not overlap with the first address space.

The hybrid virtual machine can maintain connectivity with the other non-VNET virtual machines during migration to the VNET.

The first packet processing rule set may include encapsulation rules that specify how encapsulation should be performed on the first data packets. The second packet processing rule set may permit the second data packets to be transmitted without encapsulation.

The network stack may be included within a first host machine. The non-VNET virtual machine may run on the first host machine.

The network stack may be configured to receive a data packet that includes a destination address, compare the destination address to at least one of the first address space and the second address space, and select a rule set for processing the data packet based on the comparison.

The system may further include a VNET virtual machine that runs on a second host machine. The network stack may be configured to encapsulate a data packet that is destined for the VNET virtual machine to form an encapsulated data packet.

The encapsulated data packet may include a header and a payload. The header of the encapsulated data packet may include a header source address and a header destination address. The hybrid virtual machine may run on a first host machine. The header source address may include a first physical IP address that is associated with the first host machine. The header destination address may include a second physical IP address that is associated with the second host machine. The payload of the encapsulated data packet may include the data packet.

The system may further include additional instructions that are executable by the one or more processors to migrate a plurality of non-VNET virtual machines to the VNET. The plurality of non-VNET virtual machines may maintain connectivity with the other non-VNET virtual machines during migration to the VNET. The system may further include additional instructions that are executable by the one or more processors to deploy a plurality of pure VNET virtual machines within the virtual network subsequent to the migration.

Each non-VNET virtual machine may be identified by a unique physical IP address. The plurality of pure VNET virtual machines may not be individually associated with physical IP addresses.

In accordance with another aspect of the present disclosure, a computer-readable medium is disclosed that includes instructions that are executable by one or more processors to cause a network stack within a host machine to receive a first data packet that includes a first source address and a first destination address. The first source address corresponds to a hybrid virtual machine that is part of a virtual network. The first destination address corresponds to a first destination virtual machine. The computer-readable medium also includes instructions that are executable by one or more processors to determine, based on the first destination address, that the first destination virtual machine belongs to the virtual network. The computer-readable medium also includes instructions that are executable by one or more processors to encapsulate the first data packet based on encapsulation rules that are specified in a first packet processing rule set and receive a second data packet that includes a second source address and a second destination address. The second source address corresponds to the hybrid virtual machine. The second destination address corresponds to a second destination virtual machine. The computer-readable medium also includes instructions that are executable by one or more processors to determine, based on the second destination address, that the second destination virtual machine does not belong to the virtual network. The computer-readable medium also includes instructions that are executable by one or more processors to cause the second data packet to be transmitted to the second destination virtual machine without encapsulation based on a second packet processing rule set that is different from the first packet processing rule set.

The first source address may include a virtual network address. The second source address may include a physical internet protocol (IP) address.

The computer-readable medium may further include additional instructions that are executable by the one or more processors to define a first address space for the virtual network and define a second address space for virtual machines outside of the virtual network. The second address space may be distinct from the first address space and may not overlap with the first address space.

Determining that the first destination virtual machine belongs to the virtual network may include determining that the first destination address is included within the first address space.

Determining that the second destination virtual machine does not belong to the virtual network may include determining that the second destination address is not included within the first address space.

Determining that the second destination virtual machine does not belong to the virtual network may include determining that the second destination address is included within the second address space.

Encapsulating the first data packet forms an encapsulated data packet that may include a header and a payload. The header of the encapsulated data packet may include a header source address and a header destination address. The header source address may include a first physical internet protocol (IP) address. The first physical IP address may be associated with a first host machine that comprises the hybrid virtual machine. The header destination address may include a second physical IP address. The second physical IP address may be associated with a second host machine that includes the second destination virtual machine. The payload of the encapsulated data packet may include the first data packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
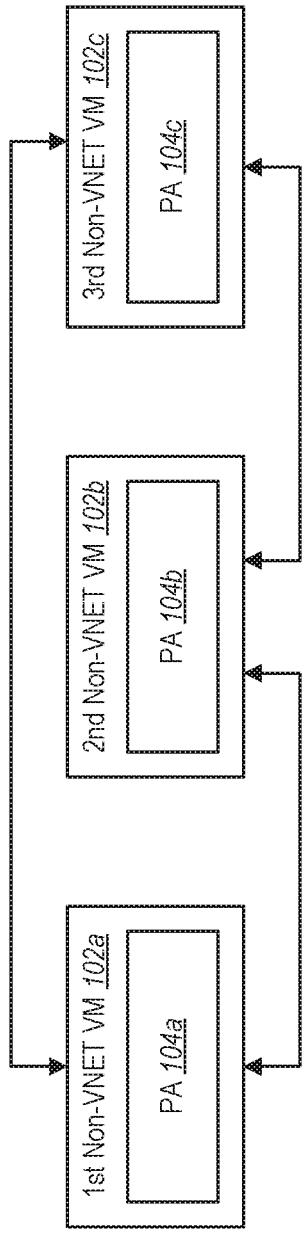
FIG. 1A illustrates an example of a deployment within a cloud computing system that includes a plurality of non-VNET VMs.

As noted above, VNET VMs are currently unable to communicate directly with non-VNET VMs (and vice versa). The present disclosure describes techniques that facilitate such communication. More specifically, the present disclosure is related to a hybrid state for a virtual machine (VM) in a cloud computing system. The hybrid state enables a VM to communicate with both VNET VMs and non-VNET VMs.

In at least some implementations of the techniques disclosed herein, there may be a unique physical IP address associated with each non-VNET VM. In this context, the term "physical IP address" can refer to an IP address that is routable on a physical computer network. Non-VNET VMs can use physical IP addresses to communicate with each other.

For example, consider two non-VNET VMs: a first non-VNET VM and a second non-VNET VM. The first non-VNET VM can be associated with a first physical IP address, which may be referred to as PA1. The second non-VNET VM can be associated with a second physical IP address, which may be referred to as PA2. Suppose that the first non-VNET VM sends a data packet to the second non-VNET VM. In this example, the source address of the data packet would be PA1, and the destination address of the data packet would be PA2.

In at least some implementations of the techniques disclosed herein, a VNET VM can use a private virtual IP address for communication with other VNET VMs. This private virtual IP address may be referred to herein as a VNET address. VNET addresses can be assigned by customers of a cloud computing provider, in which case a VNET address may be referred to as a customer address (CA). The VNET address (or CA) is unique within the context of the VNET, but may not be unique outside of that context. VNET VMs can use VNET addresses to communicate with each other. In addition, encapsulation can be performed so that the physical IP addresses of the host machines on which the VNET VMs are running are also used to facilitate communication between VNET VMs.

For example, consider two VNET VMs: a first VNET VM and a second VNET VM. For purposes of the present example, it will be assumed that the first VNET VM is associated with a first VNET address (e.g., a first customer address), which may be referred to as CA1. It will also be assumed that the second VNET VM is associated with a second VNET address (e.g., a second customer address), which may be referred to as CA2. In addition, it will be assumed that the VNET VMs are running on different host machines. In particular, it will be assumed that the first VNET VM is running on a first host machine with a first physical IP address, which may be referred to as PA1. It will also be assumed that the second VNET VM is running on a second host machine with a second physical IP address, which may be referred to as PA2. Suppose that the first VNET VM sends a data packet to the second VNET VM. The first VNET VM would create a data packet with a source address of CA1 and a destination address of CA2. This data packet would be delivered to a network stack on the first host machine. This network stack would perform encapsulation to create an outer header for the data packet. Within the outer header, the source address would be PA1, and the destination address would be PA2.

As noted above, VNET VMs and non-VNET VMs are currently unable to directly communicate with each other. In other words, although communication between VNET VMs and non-VNET VMs can occur, such communication currently requires at least one intermediate entity (e.g., a load balancer) within the VNET that has a public IP address. A non-VNET VM can communicate with a VNET VM through such an intermediate entity. For example, a non-VNET VM could send a data packet to the intermediate entity, which could then deliver the data packet to the VNET VM.

However, a non-VNET VM is currently unable to send a data packet directly to the VNET VM (or vice versa). For example, a non-VNET VM is currently not permitted to send a data packet that is addressed to the VNET address (e.g., the customer address) of the VNET VM. This is at least partially because the address spaces of VNET VMs and non-VNET VMs can overlap. In other words, there can be some overlap between the VNET addresses (e.g., customer addresses) that are associated with VNET VMs and the physical IP addresses that are associated with non-VNET VMs.

There are, however, various reasons why it can be desirable for VNET VMs and non-VNET VMs to be able to directly communicate with each other. As one example, consider a deployment of non-VNET VMs that is being migrated to a VNET. Because it is desirable for the migration to occur with minimal interruption (ideally no interruption) of service, the migration can occur on a gradual basis. For example, just one VM (or a few VMs) can be migrated at a time. This means that, within the deployment, there could be (i) non-VNET VMs that have been migrated to the VNET, (ii) non-VNET VMs that have not yet been migrated to the VNET, and (iii) newly created VMs within the VNET (which may be referred to as "pure" VNET VMs). It can be desirable for (i) to be able to communicate with (ii), and also for (i) to be able to communicate with (iii).

One aspect of the present disclosure makes such communication possible by creating a hybrid state for a VM that was initially created as a non-VNET VM but has been migrated to a VNET. A VM that is operating in the hybrid state can communicate with other VMs in the VNET as well as non-VNET VMs that have not yet been migrated to the VNET.

FIG. 1A illustrates an example of a deployment within a cloud computing system that includes three non-VNET VMs: a first non-VNET VM 102a, a second non-VNET VM 102b, and a third non-VNET VM 102c. The first non-VNET VM 102a includes a physical address (PA) 104a, the second non-VNET VM 102b includes a PA 104b, and the third non-VNET VM 102c includes a PA 104c.

For purposes of the present example, it will be assumed that all of the non-VNET VMs 102a-c shown in FIG. 1A are able to communicate with each other. The non-VNET VMs 102a-c use the PAs 104a-c for such communication. For example, suppose that the first VM 102a sends a data packet to the second VM 102b. The source address of that data packet would be the PA 104a of the first VM 102a, and the destination address of that data packet would be the PA 104b of the second VM 102b.

Figure 1B:
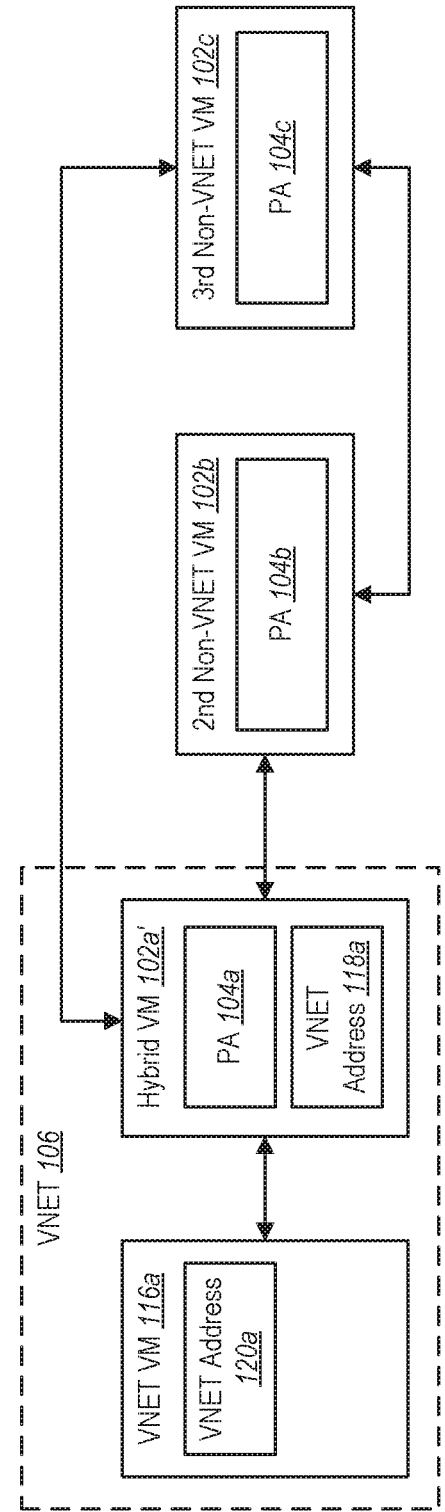
FIG. 1B illustrates the deployment of FIG. 1A after one of the non-VNET VMs has been migrated to a VNET and transitioned to a hybrid VM that operates in a hybrid state.

Referring to both FIG. 1A and FIG. 1B, suppose that this deployment of non-VNET VMs 102a-c is going to be migrated to a VNET 106. This migration can occur gradually (e.g., one VM at a time). Suppose that the first non-VNET VM 102a is migrated first. FIG. 1B illustrates a point in time at which the first non-VNET VM 102a has been migrated to the VNET 106, but the second non-VNET VM 102b and the third non-VNET VM 102c have not yet been migrated to the VNET 106. The first non-VNET VM 102a shown in FIG. 1A has been changed to a hybrid VM 102a' in FIG. 1B. The hybrid VM 102a' operates in a hybrid state that enables the hybrid VM 102a' to continue to communicate with the second non-VNET VM 102b and the third non-VNET VM 102c while those VMs 102b-c remain outside of the VNET 106. The hybrid state also allows the hybrid VM 102a' to communicate with other VNET VMs (i.e., other VMs within the VNET 106), such as the VNET VM 116a shown in FIG. 1B.

In the hybrid state, the hybrid VM 102a' continues to use its physical address (the PA 104a) to communicate with the second non-VNET VM 102b and the third non-VNET VM 102c. However, the hybrid VM 102a' is assigned a VNET address 118a to use for communication with other VMs within the VNET 106, such as the VNET VM 116a shown in FIG. 1B. The VNET address 118a is unique within the context of the VNET 106, but may not be unique outside of that context. In some implementations, the VNET address 118a may be referred to as a customer address (CA), because the VNET address 118a can be assigned by a customer of a cloud computing provider that administers the cloud computing system.

A VNET VM that is assigned to the VNET 106 when the VNET VM is initially created (instead of being created outside of the VNET 106 and then migrated to the VNET 106) may be referred to as a "pure" VNET VM. The VNET VM 116a shown in FIG. 1B can be a pure VNET VM. If the VNET VM 116a is a "pure" VNET VM, the VNET VM 116a is not assigned a physical IP address. Instead, the VNET VM 116a can be assigned a VNET address 120a that is unique within the context of the VNET 106 but may not be unique outside of that context. The hybrid VM 102a' uses its VNET address 118a to communicate with the VNET VM 116a.

Thus, while operating in the hybrid state, the hybrid VM 102a' can be configured to send data packets to (and receive data packets from) the non-VNET VMs 102b-c. The hybrid VM 102a' can also be configured to send data packets to (and receive data packets from) other VMs within the VNET 106, such as the VNET VM 116a.

Figure 1C:
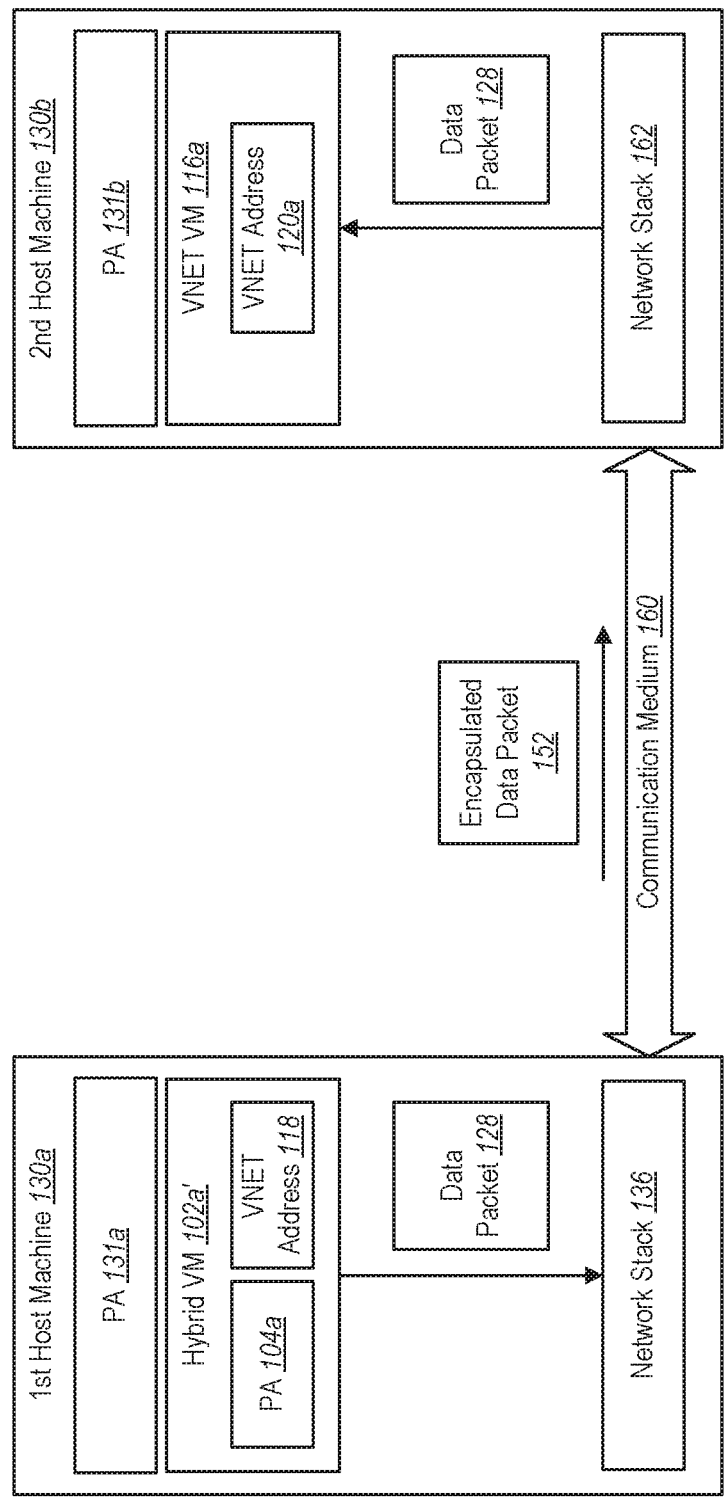
FIG. 1C illustrates an example showing how a data packet can be sent from a hybrid VM to a VNET VM.
Figure 1D:
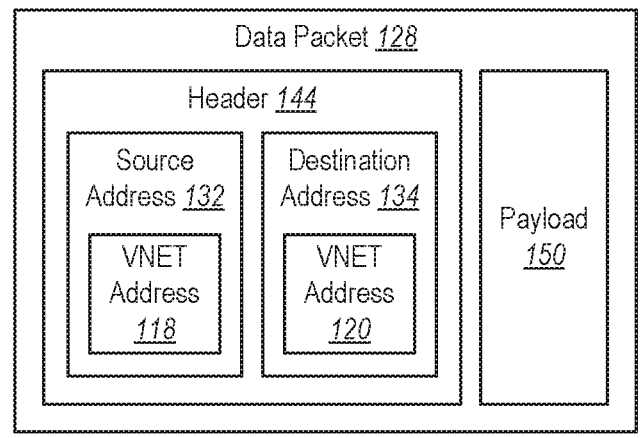
FIG. 1D illustrates an example of a data packet that a hybrid VM can send to a VNET VM.
Figure 1E:
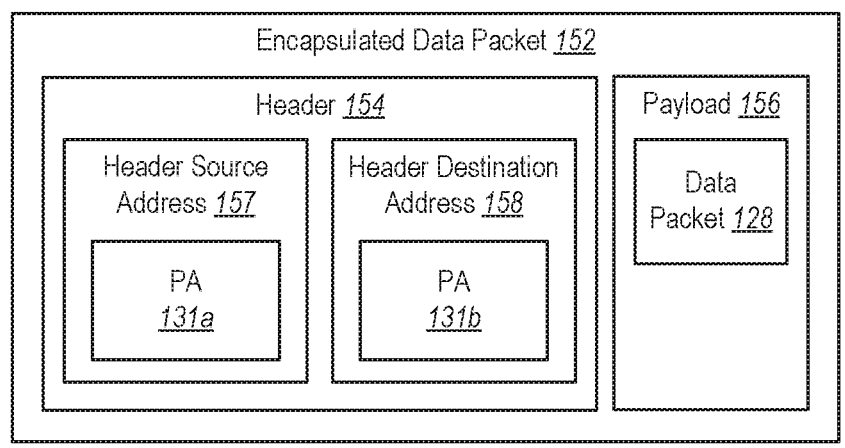
FIG. 1E illustrates an example of the data packet in FIG. 1D after encapsulation has been performed.

FIGS. 1C-1E illustrate an example showing how a data packet 128 can be sent from the hybrid VM 102a' to the VNET VM 116a. For purposes of the present example, it will be assumed that the hybrid VM 102a' and the VNET VM 116a are running on different host machines. In particular, it will be assumed that the hybrid VM 102a' is running on a first host machine 130a, and the VNET VM 116a is running on a second host machine 130b. The first host machine 130a has a physical IP address (PA) 131a, and the second host machine 130b has a different PA 131b.

Referring briefly to FIG. 1D, the data packet 128 includes a header 144 and a payload 150. As indicated above, when operating in the hybrid state, the hybrid VM 102a' uses a VNET address 118a for communication with other VMs within the VNET 106. Thus, when the hybrid VM 102a' creates a data packet 128 to send to the VNET VM 116a, the hybrid VM 102a' uses its VNET address 118a as the source address 132 in the header 144 of the data packet 128. The hybrid VM 102a' uses the VNET address 120a of the VNET VM 116a as the destination address 134 in the header 144 of the data packet 128.

Referring again to FIG. 1C, after the hybrid VM 102a' creates the data packet 128, the data packet 128 is delivered to a network stack 136 on the first host machine 130a. As will be explained in greater detail below, the network stack 136 can be configured to process data packets that are destined for non-VNET VMs (e.g., non-VNET VMs 102b-c) differently from data packets that are destined for VNET VMs (e.g., VNET VM 116a). Because the data packet 128 shown in FIG. 1C is destined for a VNET VM 116a, the network stack 136 performs encapsulation to form an encapsulated data packet 152. As shown in FIG. 1E, the encapsulated data packet 152 includes a header 154 and a payload 156 that includes the data packet 128. The header 154 of the encapsulated data packet 152 includes a source address 157 and a destination address 158. The source address 157 in the header 154 may be referred to herein as a header source address 157, and the destination address 158 in the header 154 may be referred to herein as a header destination address 158. In the depicted example, the header source address 157 is the physical IP address of the first host machine 130a (i.e., PA 131a), and the header destination address 158 is the physical IP address of the second host machine 130b (i.e., PA 131b).

The network stack 136 on the first host machine 130a causes the encapsulated data packet 152 to be transmitted over a physical communication medium 160 to the second host machine 130b. A network stack 162 on the second host machine 130b receives the encapsulated data packet 152, strips away the header 154, and delivers the data packet 128 to the VNET VM 116a.

In the example shown in FIG. 1C, it is assumed that the hybrid VM 102a' and the VNET VM 116a are running on different host machines 130a-b. However, this is not necessary. In an alternative example, the hybrid VM 102a' can send a data packet to a VNET VM that is running on the same host machine as the hybrid VM 102a' (e.g., the first host machine 130a in the example shown in FIG. 1C). In this case, the data packet can still be delivered to the network stack 136. However, it would not be necessary for encapsulation to be performed. The network stack 136 could simply deliver the data packet to the intended VNET VM on the first host machine 130a.

Figure 1F:
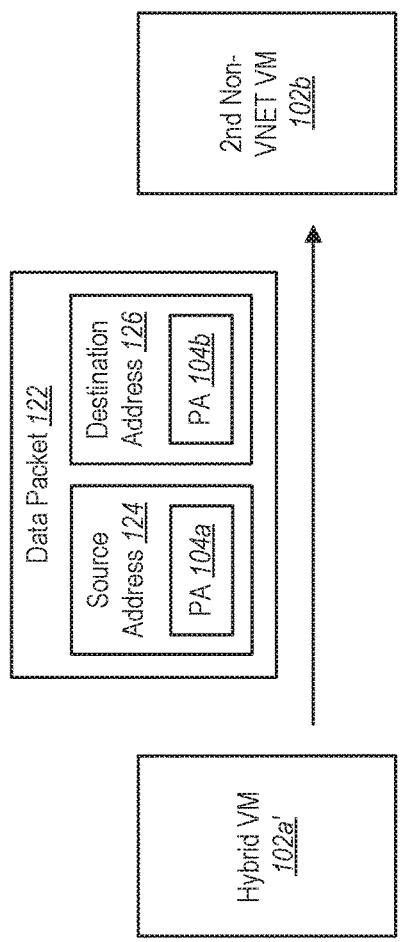
FIG. 1F illustrates an example of a data packet that a hybrid VM can send to a non-VNET VM.

FIG. 1F illustrates an example of a data packet 122 that can be sent from the hybrid VM 102a' to a non-VNET VM, such as the second non-VNET VM 102b. As indicated above, in the hybrid state the hybrid VM 102a' continues to use its physical address (the PA 104a) to communicate with the non-VNET VMs 102b-c. Thus, in the present example, the source address 124 of the data packet 122 is the PA 104a of the hybrid VM 102a', and the destination address 126 of the data packet 122 is the PA 104b of the second non-VNET VM 102b.

The hybrid VM 102a' and the second non-VNET VM 102b can be running on the same host machine or on different host machines. If the hybrid VM 102a' and the second non-VNET VM 102b are running on different host machines, the data packet 122 can traverse the same basic path as the data packet 128 shown in FIG. 1C (e.g., from the hybrid VM 102a' to the network stack 136 on the first host machine 130a, across the communication medium 160 to a network stack on the host machine on which the second non-VNET VM 102b is running). For the sake of simplicity, however, those details are omitted from FIG. 1F.

Figure 1G:
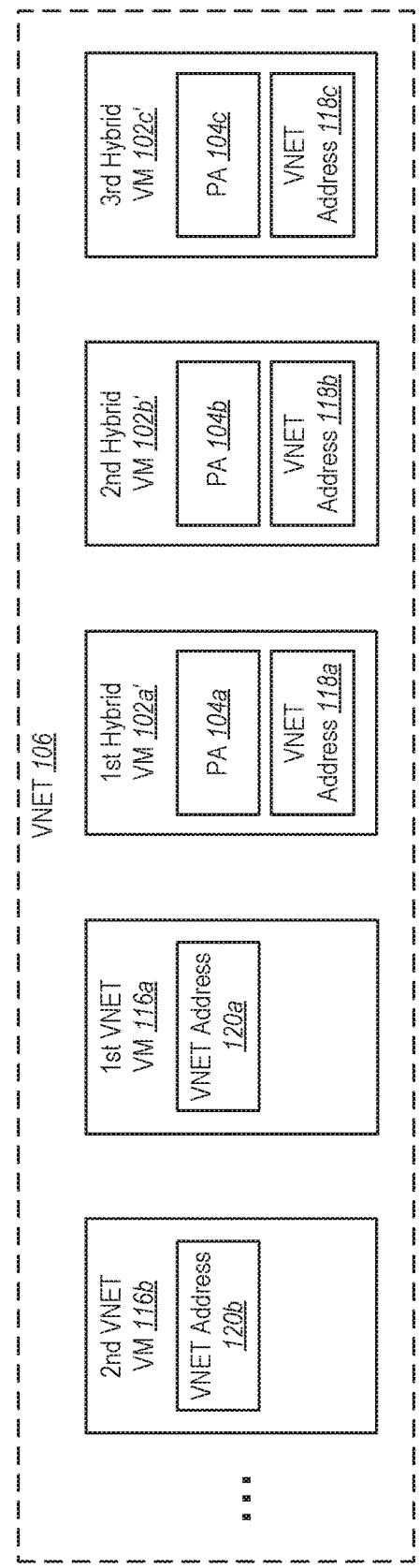
FIG. 1G illustrates the deployment of FIG. 1A after the plurality of non-VNET VMs have been migrated to a VNET and transitioned to hybrid VMs.

As indicated above, the deployment of non-VNET VMs 102a-c shown in FIG. 1A can be migrated to a VNET 106. FIG. 1G illustrates various entities within the VNET 106 after this migration has occurred. The first non-VNET VM 102a, second non-VNET VM 102b, and third non-VNET VM 102c shown in FIG. 1A have been transitioned to a first hybrid VM 102a', second hybrid VM 102b', and a third hybrid VM 102c' in FIG. 1G. The hybrid VMs 102a', 102b', 102c', maintain their physical addresses (PA 104a, PA 104b, PA 104c). In addition, the hybrid VMs 102a', 102b', 102c' are assigned VNET addresses. In particular, the first hybrid VM 102a' is assigned a first VNET address 118a, the second hybrid VM 102b' is assigned a second VNET address 118b, and the third hybrid VM 102c' is assigned a third VNET address 118c.

FIG. 1G also shows the VNET with a plurality of VNET VMs, including a first VNET VM 116a and a second VNET VM 116b. The first VNET VM 116a is assigned a first VNET address 120a, and the second VNET VM 116b is assigned a second VNET address 120b. The VNET VMs 116a, 116b may be "pure" VNET VMs. In some embodiments, the VNET VMs 116a, 116b may be created after all of the non-VNET VMs 102a, 102b, 102c have been migrated to the VNET 106 and transitioned to hybrid VMs 102a', 102b', 102c'.

To make it possible for a particular VM to operate in the hybrid state, the host machine on which the VM is running can include a network stack that is configured to process data packets that are destined for non-VNET VMs differently from data packets that are destined for VNET VMs. To facilitate this, one or more rule sets can be configured in the network stack of the host machine on which the VM is running. In this context, the term "rule" can refer to one or more actions that are performed in response to one or more conditions being satisfied. The term "rule set" can refer to a single rule or a plurality of rules. In some implementations, the network stack can include at least two different rule sets: a first rule set for processing data packets that are sent to (or received from) VNET VMs, and a second rule set for processing data packets that are sent to (or received from) non-VNET VMs.

Figure 2A:
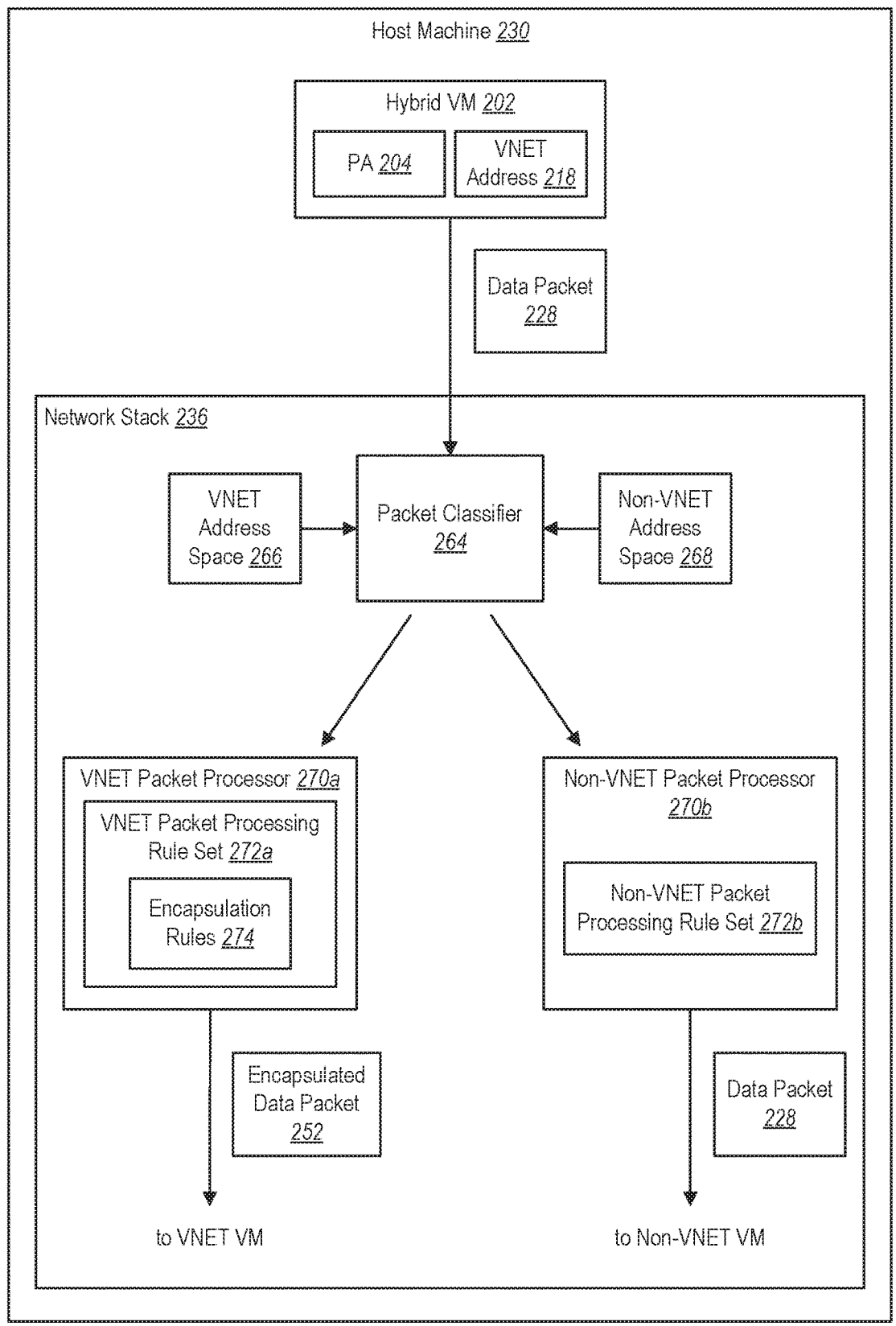
FIG. 2A illustrates an example of a network stack that is configured to implement various packet processing rule sets.

FIG. 2A illustrates an example of a network stack 236 that is configured to implement various packet processing rule sets. The network stack 236 is included on a host machine 230. A hybrid VM 202 is running on the host machine 230. The hybrid VM 202 belongs to a VNET and therefore has a VNET address 218. The hybrid VM 202 uses the VNET address 218 for communicating with other VMs within the VNET. The hybrid VM 202 also includes a physical IP address (PA) 204 that it uses to communicate with non-VNET VMs.

The hybrid VM 202 creates a data packet 228 to be sent to another VM, which can be a non-VNET VM or a VNET VM. The network stack 236 receives the data packet 228 from the hybrid VM 202. The network stack 236 includes a component that may be referred to herein as a packet classifier 264. The packet classifier 264 is configured to determine whether the data packet 228 is going to be sent to a non-VNET VM or to a VNET VM. To make this determination, the packet classifier 264 evaluates the destination address that is included in the header of the data packet 228. More specifically, the packet classifier 264 compares the destination address of the data packet 228 to an address space 266 corresponding to the VNET to which the hybrid VM 202 belongs, and selects a rule set for processing the data packet 228 based on the comparison.

More specifically, in the depicted example, the VNET addresses that are used for VNET VMs are distinct from the physical IP addresses that are used for non-VNET VMs. In other words, the address space 266 of VNET VMs is distinct from and does not overlap with the address space 268 of non-VNET VMs. Thus, by evaluating the destination address that is included in the header of the data packet 228, the packet classifier 264 is able to determine whether the data packet 228 is being sent to a VNET VM or to a non-VNET VM. If the destination address of the data packet 228 falls within the address space 266 of VNET VMs, the packet classifier 264 determines that the data packet 228 is being sent to a VNET VM. If, however, the destination address of the data packet 228 falls within the address space 268 of non-VNET VMs, the packet classifier 264 determines that the data packet 228 is being sent to a non-VNET VM.

As noted above, data packets that are being sent to VNET VMs are processed differently than data packets that are being sent to non-VNET VMs. The network stack 236 is shown with a component that is configured to process data packets that are being sent to VNET VMs. This component may be referred to as a VNET packet processor 270*a*. The network stack 236 is also shown with a component that is configured to process data packets that are being sent to non-VNET VMs. This component may be referred to as a non-VNET packet processor 270*b*. The VNET packet processor 270*a* processes data packets in accordance with a rule set that may be referred to as a VNET packet processing rule set 272*a*. The non-VNET packet processor 270*b* processes data packets in accordance with a rule set that may be referred to as a non-VNET packet processing rule set 272*b*.

If the packet classifier 264 determines that the destination address of the data packet 228 falls within the VNET address space 266, then the VNET packet processor 270*a* processes the data packet 228 based on the VNET packet processing rule set 272*a*. If, however, the packet classifier 264 determines that the destination address of the data packet 228 falls within the non-VNET address space 268, then the non-VNET packet processor 270*b* processes the data packet 228 based on the non-VNET packet processing rule set 272*b*.

In some implementations, the VNET packet processing rule set 272*a* can include one or more rules 274 specifying how encapsulation should be performed on the data packet 228. These rules 274 may be referred to herein as encapsulation rules 274. Thus, if the packet classifier 264 determines that the destination address of the data packet 228 falls within the VNET address space 266 and the data packet 228 is processed in accordance with the VNET packet processing rule set 272*a*, the data packet 228 can be encapsulated in accordance with the encapsulation rules 274. This results in the creation of an encapsulated data packet 252. The encapsulated data packet 252 can be similar to the encapsulated data packet 152 shown in FIG. 1E. For example, the encapsulated data packet 252 can include a header that includes a source address and a destination address. The source address can be the physical IP address of the host machine 230 on which the hybrid VM 202 is running. The destination address can be the physical IP address of the host machine on which the destination VM (i.e., the VM to which the data packet 228 is being sent) is running. The data packet 228 created by the hybrid VM 202 can be included in the payload of the encapsulated data packet 252.

In some implementations, the non-VNET packet processing rule set 272*b* does not include any encapsulation rules. In other words, the non-VNET packet processing rule set 272*b* can permit a data packet 228 to be transmitted to a destination VM without encapsulation. Thus, if the packet classifier 264 determines that the destination address of the data packet 228 falls within the non-VNET address space 268, the unencapsulated data packet 228 can simply be sent to the destination VM.

Figure 2B:
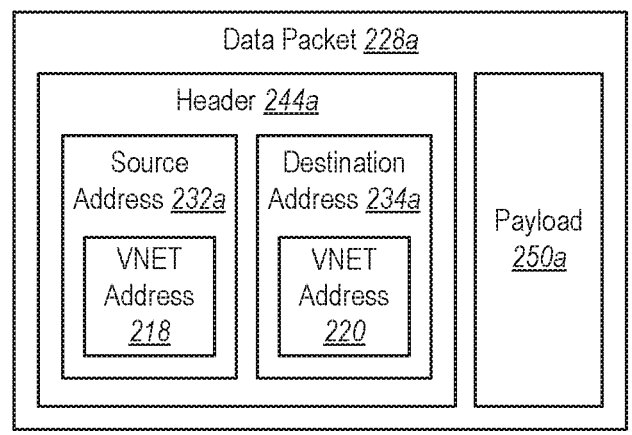
FIG. 2B illustrates an example of a data packet that the hybrid VM in the example shown in FIG. 2A can send to a VNET VM.

FIG. 2B illustrates an example of a data packet 228*a* that can be sent by the hybrid VM 202 and processed by the network stack 236 in the example shown in FIG. 2A. The data packet 228*a* shown in FIG. 2B is destined for a VNET VM (i.e., for another VM within the VNET to which the hybrid VM 202 belongs). The data packet 228*a* includes a header 244*a* and a payload 250*a*. The header 244*a* includes a source address 232*a* and a destination address 234*a*.

The source address 232*a* corresponds to the hybrid VM 202. As discussed above, the hybrid VM 202 includes two different addresses, a PA 204 and a VNET address 218. Because the data packet 228*a* is being sent to a VNET VM, the source address 232*a* includes the VNET address 218 of the hybrid VM 202.

The destination address 234*a* corresponds to the destination VM. Because the data packet 228*a* shown in FIG. 2B is destined for a VNET VM, the destination address 234*a* includes a VNET address 220 corresponding to the VNET VM.

The data packet 228*a* can be processed by the network stack 236 in the following manner. The packet classifier 264 can determine, based on the destination address 234*a*, that the destination VM is part of the same VNET to which the hybrid VM 202 belongs. More specifically, the packet classifier 264 can compare the destination address 234*a* (i.e., the VNET address 220) to the VNET address space 266 and determine that the destination address 234*a* is included within the VNET address space 266.

Based on determining that the destination VM is part of the same VNET to which the hybrid VM 202 belongs, the data packet 228*a* can be processed by the VNET packet processor 270*a*. More specifically, the VNET packet processor 270*a* can process the data packet 228*a* in accordance with the VNET packet processing rule set 272*a*. This can include encapsulating the data packet 228*a* in accordance with one or more encapsulation rules 274 to form an encapsulated data packet 252.

Figure 2C:
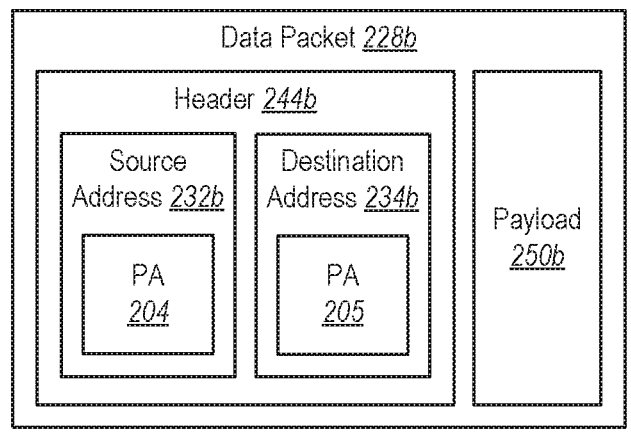
FIG. 2C illustrates an example of a data packet that the hybrid VM in the example shown in FIG. 2A can send to a non-VNET VM.

FIG. 2C illustrates another example of a data packet 228*b* that can be sent by the hybrid VM 202 and processed by the network stack 236 in the example shown in FIG. 2A. The data packet 228*b* shown in FIG. 2C is destined for a non-VNET VM (i.e., for a VM that is not part of the VNET to which the hybrid VM 202 belongs). The data packet 228*b* includes a header 244*b* and a payload 250*b*. The header 244*b* includes a source address 232*b* and a destination address 234*b*.

The source address 232*b* corresponds to the hybrid VM 202. Because the data packet 228*b* is being sent to a non-VNET VM, the source address 232*b* is the PA 204 of the hybrid VM 202.

The destination address 234*b* corresponds to the destination VM. Because the data packet 228*b* shown in FIG. 2C is destined for a non-VNET VM, the destination address 234*b* includes a PA 205 corresponding to the non-VNET VM.

The data packet 228*b* can be processed by the network stack 236 in the following manner. The packet classifier 264 can determine, based on the destination address 234*b*, that the destination VM is not part of the same VNET to which the hybrid VM 202 belongs. For example, the packet classifier 264 can compare the destination address 234*b* (i.e., the PA 205) to the VNET address space 266 and determine that the destination address 234*b* is not included within the VNET address space 266. As another example, the packet classifier 264 can compare the destination address 234*b* to the non-VNET address space 268 and determine that the destination address 234*b* is included within the non-VNET address space 268.

Based on determining that the destination VM is not part of the same VNET to which the hybrid VM 202 belongs, the data packet 228*b* can be processed by the non-VNET packet processor 270*b*. More specifically, the non-VNET packet processor 270*b* can process the data packet 228*b* in accordance with the non-VNET packet processing rule set 272*b*. Thus, the data packet 228*b* can be transmitted to the destination VM without encapsulation.

Figure 3:
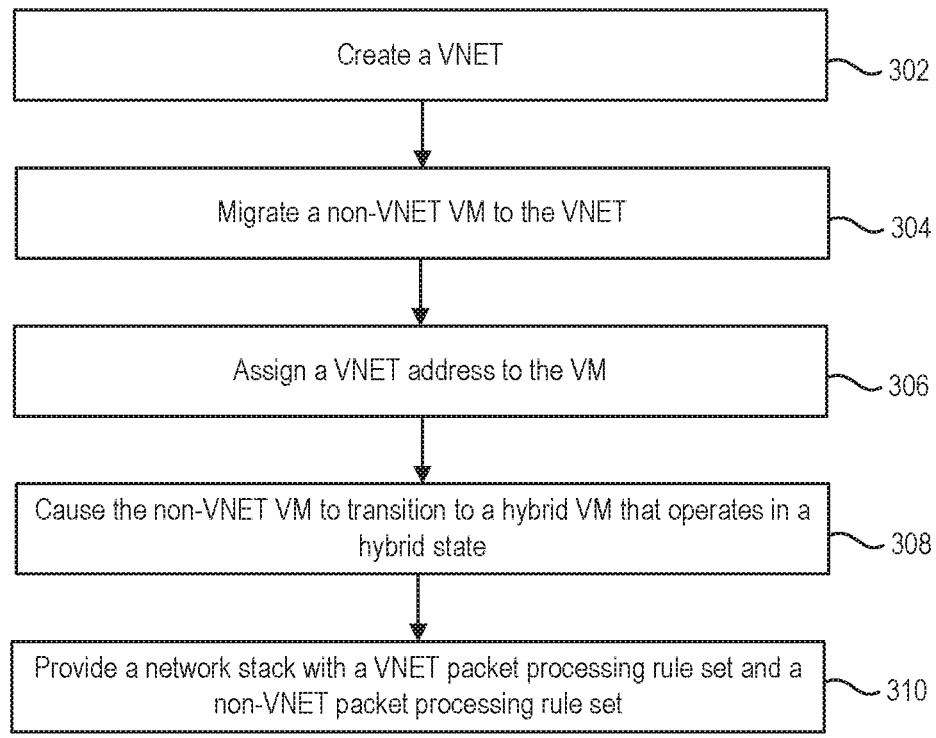
FIG. 3 illustrates an example of a method that can be performed by one or more system-level entities within a cloud computing system in order to transition a single non-VNET VM to a VNET.

FIG. 3 illustrates an example of a method 300 for facilitating communication between non-VNET VMs 102*a-c* and VNET VMs 116*a-b* in accordance with the present disclosure. The method 300 can be implemented by one or more system-level entities within a cloud computing system, such as a fabricator and/or a data center controller. The method 300 will be described in relation to the examples shown in FIGS. 1A-G and FIGS. 2A-C.

The method 300 includes creating 302 a VNET 106 and migrating 304 a non-VNET VM 102a to the VNET 106. The action of migrating 304 the non-VNET VM 102a to the VNET 106 can include assigning 306 a VNET address 118a to the VM 102a. The VNET address 118a enables the VM 102a to communicate with other VMs in the VNET 106 (e.g., the VNET VM 116a).

The method 300 also includes causing 308 the non-VNET VM 102a to transition to a hybrid VM 102a' that operates in a hybrid state. Advantageously, the non-VNET VM 102a/hybrid VM 102a' does not lose connectivity with other non-VNET VMs 102b-c during this transition. As discussed above, the non-VNET VM 102a is assigned a physical IP address (PA) 104a. In the hybrid state, the hybrid VM 102a' continues to use the PA 104a to communicate with the other non-VNET VMs 102b-c.

The method 300 also includes providing 310 a network stack 236 with a VNET packet processing rule set 272a for processing data packets that are being sent to VNET VMs, and a non-VNET packet processing rule set 272b for processing data packets that are being sent to non-VNET VMs. As described above, the VNET packet processing rule set 272a can be configured to process data packets corresponding to a VNET address space 266 that has been defined for the VNET 106. The non-VNET packet processing rule set 272b can be configured to process data packets corresponding to a non-VNET address space 268 that is distinct from and does not overlap with the VNET address space 266.

Figure 4:
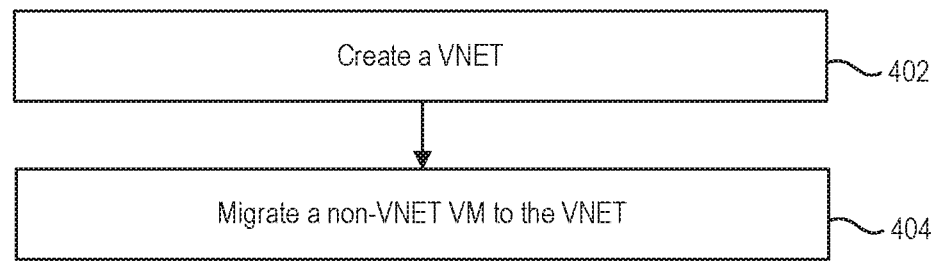
FIG. 4 illustrates an example of a method that can be performed by one or more system-level entities within a cloud computing system in order to transition a plurality of non-VNET VMs to a VNET.

FIG. 4 illustrates another example of a method 400 for facilitating communication between non-VNET VMs 102a-c and VNET VMs 116a-b in accordance with the present disclosure. The method 400 can be implemented by one or more system-level entities within a cloud computing system, such as a fabricator and/or a data center controller. The method 400 will be described in relation to the examples shown in FIGS. 1A-G and FIGS. 2A-C.

The method 400 includes migrating 402 a plurality of non-VNET VMs 102a-c to a VNET 106 and causing the plurality of non-VNET VMs 102a-c to transition to hybrid VMs 102a'-c' that operate in a hybrid state. Some or all of the actions described above in connection with the method 300 shown in FIG. 3 may be performed for each of the non-VNET VMs 102a-c.

The method 400 also includes deploying 404 a plurality of "pure" VNET VMs 116a-b within the VNET 106. As discussed above, the pure VNET VMs 116a-b can be assigned to the VNET 106 when the VNET VMs 116a-b are initially created (instead of being created outside of the VNET 106 and then migrated to the VNET 106). In some embodiments, the pure VNET VMs 116a-b can be deployed after the plurality of non-VNET VMs 102a-c have been migrated to the VNET 106 and transitioned to hybrid VMs 102a'-c'.

Figure 5:
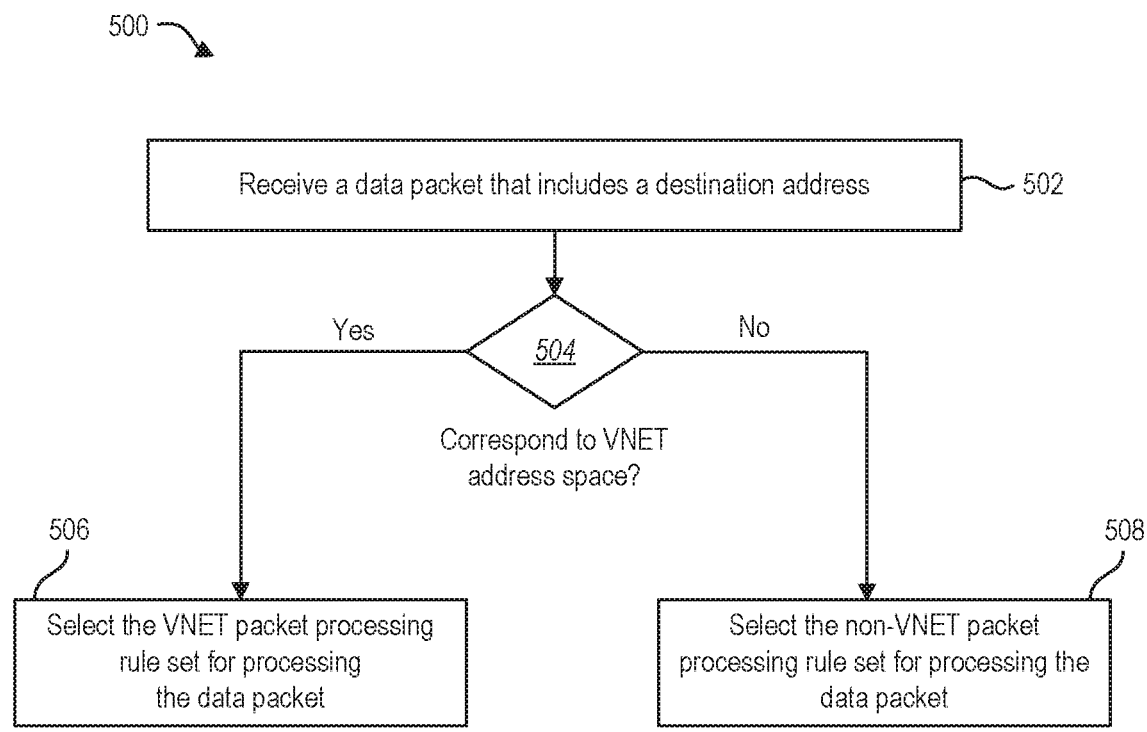
FIG. 5 illustrates an example of a method that can be performed by a network stack running on a host machine within a cloud computing system to facilitate communication between non-VNET VMs and VNET VMs.

FIG. 5 illustrates another example of a method 500 for facilitating communication between non-VNET VMs 102a-c and VNET VMs 116a-b in accordance with the present disclosure. The method 500 can be implemented by a network stack 236 running on a host machine 230 within a cloud computing system. The method 500 will be described in relation to the examples shown in FIGS. 1A-G and FIGS. 2A-C.

As a prerequisite to the method 500, a VNET address space 266 and a non-VNET address space 268 can be defined. The VNET address space 266 and the non-VNET address space 268 can be defined so that they are distinct from and do not overlap with one another.

The method 500 includes receiving 502 a data packet 228. The data packet 228 includes, among other things, a destination address. The destination address can be used to determine 504 whether the data packet 228 corresponds to the VNET address space 266. For example, the destination address of the data packet 228 can be compared to the VNET address space 266 and/or to the non-VNET address space 268.

If it is determined 504 that the data packet 228 corresponds to the VNET address space 266, then the VNET packet processing rule set 272a can be selected 506 for processing the data packet 228. If, however, it is determined 504 that the data packet 228 does not correspond to the VNET address space 266, then the non-VNET packet processing rule set 272b can be selected 508 for processing the data packet 228.

Figure 6:
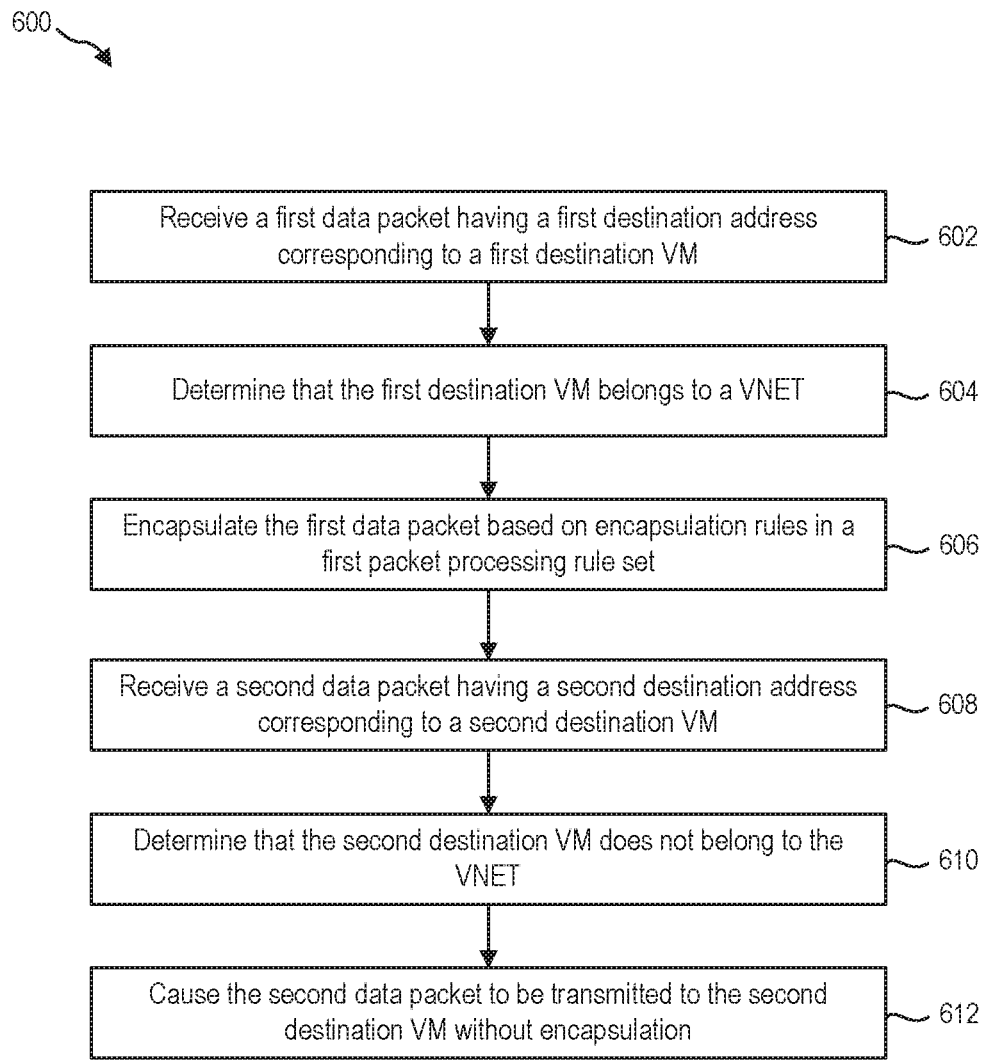
FIG. 6 illustrates an example of a method that can be performed by a network stack running on a host machine within a cloud computing system to process data packets.

FIG. 6 illustrates an example of a method 600 that can be implemented by a network stack 236 on a host machine 230 that includes a hybrid VM 202. The method 600 will be described in relation to the example shown in FIGS. 2A-C.

The method 600 includes receiving 602 a first data packet 228a and determining 604, based on the destination address 234a of the first data packet 228a, that the destination VM is part of the VNET to which the hybrid VM 202 belongs. In other words, the method 600 includes determining 604 that the intended recipient of the first data packet 228a is a VNET VM. In response to determining 604 that the destination VM is a VNET VM, the method 600 also includes processing 606 the first data packet 228a in accordance with a VNET packet processing rule set 272a.

The method 600 also includes receiving 608 a second data packet 228b and determining 610, based on the destination address 234b of the second data packet 228b, that the destination VM is not part of the VNET to which the hybrid VM 202 belongs. In other words, the method 600 includes determining 610 that the intended recipient of the second data packet 228b is a non-VNET VM. In response to determining 610 that the destination VM is a non-VNET VM, the method 600 also includes processing 612 the second data packet 228b in accordance with a non-VNET packet processing rule set 272b.

Figure 7:
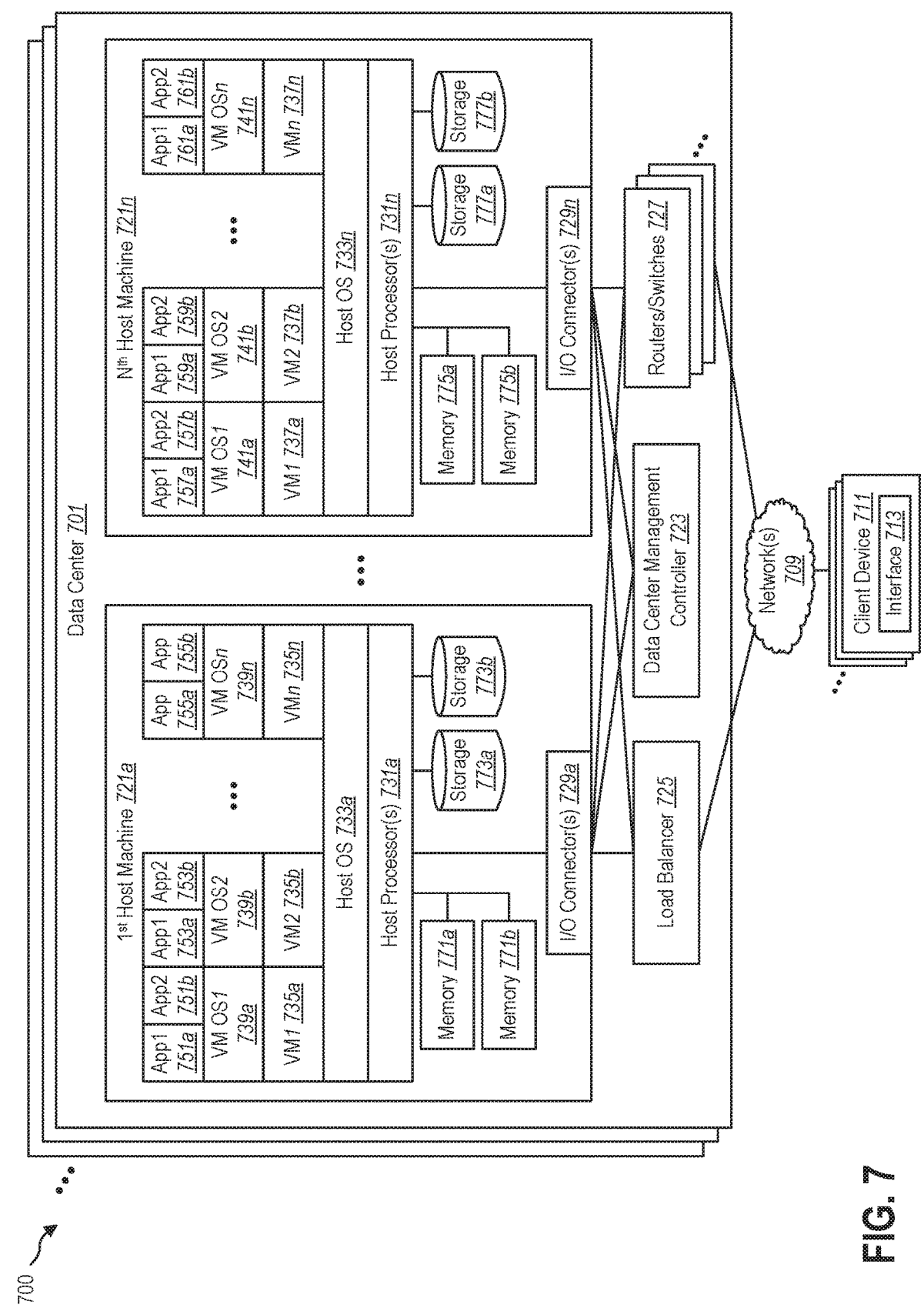
FIG. 7 illustrates an example of certain components that can be utilized in a cloud computing system.

FIG. 7 illustrates an example of certain components that can be utilized in a cloud computing system 700. Broadly speaking, the cloud computing system 700 includes two sections, a front end and a back end, that are in electronic communication with one another via one or more computer networks 709 (typically including the Internet). The front end of the cloud computing system 700 includes an interface 713 that users encounter through a client device 711. The back end of the cloud computing system 700 includes the resources that deliver cloud-computing services.

More specifically, the back end of the cloud computing system 700 includes a plurality of data centers 701. A particular data center 701 includes a plurality of host machines 721a-n, including a first host machine 721a and an Nth host machine 721n. The host machines 721a-n can alternatively be referred to as servers. A data center management controller 723 performs management operations with respect to the host machines 721a-n. A load balancer 725 distributes requests and workloads over the host machines 721a-n to prevent a situation where a single host machine becomes overwhelmed and also to maximize available capacity and performance of the resources in the data center 701. A plurality of routers/switches 727 support data traffic between the host machines 721*a-n*, and also between the data center 701 and external resources and users via the network(s) 709.

The host machines 721*a-n* can be traditional standalone computing devices and/or they can be configured as individual blades in a rack of many server devices. The host machines 721*a-n* each have one or more input/output (I/O) connectors. In FIG. 7, the first host machine 721*a* is shown with an I/O connector 729*a*, and the Nth host machine 721*n* is shown with an I/O connector 729*n*. The I/O connectors 729*a-n* enable the host machines 721*a-n* to be placed in electronic communication with each other and with other computing entities in the cloud computing system 700, such as the data center management controller 723.

The host machines 721*a-n* each include one or more processors, which may be referred to herein as host processors. In FIG. 7, the first host machine 721*a* is shown with a set of one or more host processors 731*a*, and the Nth host machine 721*n* is shown with a set of one or more host processors 731*n*. The host processors 731*a-n* can be general purpose single- or multi-chip microprocessors (e.g., an Advanced RISC (Reduced Instruction Set Computer) Machine (ARM)), special purpose microprocessors (e.g., a digital signal processor (DSP)), microcontrollers, programmable gate arrays, and so forth, including combinations thereof. The host processors 731*a-n* can alternatively be referred to as central processing units (CPUs).

The host machines 721*a-n* each include storage (e.g., hard disk drives) and memory (e.g., RAM) that can be accessed and used by the host processors and VMs. In FIG. 7, the first host machine 721*a* is shown with memory 771*a-b* and storage 773*a-b*, and the Nth host machine 721*n* is shown with memory 775*a-b* and storage 777*a-b*.

The host machines 721*a-n* each include an operating system (OS), which may be referred to herein as a host operating system (or host OS). In FIG. 7, the first host machine 721*a* is shown with a host operating system 733*a*, and the Nth host machine 721*n* is shown with a host operating system 733*n*. The host operating systems 733*a-n* are executed by the host processors 731*a-n*, and they support multiple virtual machines. In FIG. 7, the first host machine 721*a* is shown with a plurality of VMs including a first VM (VM1) 735*a*, a second VM (VM2) 735*b*, and an Nth VM (VMn) 735*n*. The Nth host machine 721*n* is also shown with a plurality of VMs including a first VM (VM1) 737*a*, a second VM (VM2) 737*b*, and an Nth VM (VMn) 737*n*.

Each VM can run its own operating system. FIG. 7 shows VM1 735*a* on the first host machine 721*a* running VM OS1 739*a*, VM2 735*b* on the first host machine 721*a* running VM OS2 739*b*, and VMn 735*n* on the first host machine 721*a* running VM OSn 739*n*. Similarly, FIG. 7 shows VM1 737*a* on the Nth host machine 721*n* running VM OS1 741*a*, VM2 737*b* on the Nth host machine 721*n* running VM OS2 741*b*, and VMn 737*n* on the Nth host machine 721*n* running VM OSn 741*n*.

In some implementations, the various VM operating systems running on a particular host machine can all be the same operating system. Alternatively, the various VM operating systems running on a particular host machine can include different operating systems. The VM operating systems can be, for example, different versions of the same operating system (e.g., different VMs can be running both current and legacy versions of the same operating system). Alternatively, the VM operating systems on a particular host machine can be provided by different manufacturers.

One or more applications can be running on each VM. FIG. 7 shows VM1 735*a* on the first host machine 721*a* running App1 751*a* and App2 751*b*, VM2 735*b* on the first host machine 721*a* running App1 753*a* and App2 753*b*, and VMn 735*n* on the first host machine 721*a* running App1 755*a* and App2 755*b*. Similarly, FIG. 7 shows VM1 737*a* on the Nth host machine 721*n* running App1 757*a* and App2 757*b*, VM2 737*b* on the Nth host machine 721*n* running App1 759*a* and App2 759*b*, and VMn 737*n* on the Nth host machine 721*n* running App1 761*a* and App2 761*b*.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory can be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein can be interchanged with one another without departing from the scope of the claims. In other words, unless a specific order of steps, operations, and/or actions is required for proper functioning of the method that is being described, the order and/or use of specific steps, operations, and/or actions can be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein can be combinable with any element or feature of any other embodiment described herein, where compatible.

The present disclosure can be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   migrating a non-virtual network virtual machine (non-VNET virtual machine) having an existing physical internet protocol (IP) address and residing on a host machine to a virtual network (VNET) to generate a migrated non-VNET virtual machine by assigning a VNET address to the migrated non-VNET virtual machine while the migrated non-VNET virtual machine maintains the existing physical IP address, wherein the non-VNET virtual machine is one of a plurality of non-VNET virtual machines;
   in response to migrating the non-VNET virtual machine to the VNET, providing a network stack on a host machine with a first packet processing rule set and a second packet processing rule set, wherein the first packet processing rule set is configured to process first data packets from the migrated non-VNET virtual machine corresponding to a first address space that has been defined for the virtual network, and wherein the second packet processing rule set is configured to process second data packets from the migrated non-VNET virtual machine corresponding to a second address space that is distinct from the first address space and that does not overlap with the first address space; and
   in response to migrating the non-VNET virtual machine to the VNET, operating the migrated non-VNET virtual machine in a hybrid state, wherein operating the migrated non-VNET virtual machine in the hybrid state enables the network stack on the host machine to utilize the provided first packet processing rule set when the non-VNET virtual machine communicates the first data packets with a previously migrated non-VNET virtual machine of the plurality of non-VNET virtual machines within the VNET and utilize the provided second packet processing rule set when the migrated non-VNET virtual machine communicates the second data packets with other non-VNET virtual machines of the plurality of non-VNET virtual machines outside of the VNET, wherein the second data packets includes the existing physical IP address, and wherein the first data packets includes the assigned VNET address.

2. The method of claim 1, wherein the non-VNET virtual machine does not lose connectivity with the other non-VNET virtual machines of the plurality of non-VNET virtual machines outside of the VNET as the non-VNET virtual machine is migrated to the virtual network.

3. The method of claim 1, wherein:
   the first packet processing rule set comprises encapsulation rules that specify how encapsulation should be performed on the first data packets; and
   the second packet processing rule set permits the second data packets to be transmitted without encapsulation.

4. A system, comprising:
   one or more processors;
   memory in electronic communication with the one or more processors; and
   instructions stored in the memory, the instructions being executable by the one or more processors to:
      create a virtual network (VNET);
      migrate a non-VNET virtual machine having an existing physical internet protocol (IP) address and residing on a host machine to the VNET by assigning a VNET address to the migrated non-VNET virtual machine while the non-VNET virtual machine maintains the existing physical IP address;
      provide a network stack on the host machine with a first packet processing rule set and a second packet processing rule set, wherein the first packet processing rule set is configured to process first data packets from the migrated non-VNET virtual machine corresponding to a first address space that has been defined for the virtual network, and wherein the second packet processing rule set is configured to process second data packets from the migrated non-VNET virtual machine corresponding to a second address space that is distinct from the first address space and that does not overlap with the first address space; and
      transition the migrated non-VNET virtual machine to operate in a hybrid virtual state, wherein operating the migrated non-VNET virtual machine in the hybrid state enables the network stack on the host machine to utilize the provided first packet processing rule set when the non-VNET virtual machine communicates the first data packets with a previously migrated non-VNET virtual machine of a plurality of non-VNET virtual machines within the VNET and utilize the provided second packet processing rule set when the migrated non-VNET virtual machine communicates the second data packets with other non-VNET virtual machines of the plurality of non-VNET virtual machines outside of the VNET, wherein the second data packets includes the existing physical IP address, and wherein the first data packets includes the assigned VNET address.

5. The system of claim 4, wherein the migrated non-VNET virtual machine maintains connectivity with other non-VNET virtual machines during migration to the VNET which the hybrid virtual machine previously communicated with as the non-VNET virtual machine.

6. The system of claim 4, wherein:
   the first packet processing rule set comprises encapsulation rules that specify how encapsulation should be performed on the first data packets; and
   the second packet processing rule set permits the second data packets to be transmitted to the other non-VNET virtual machines without encapsulation.

7. The system of claim 4, wherein the VNET contains one or more pure VNET virtual machines within the VNET, and wherein the one or more pure VNET virtual machines has an assigned VNET address and do not maintain a physical IP address.

8. The system of claim 4, wherein the network stack is configured to:
   receive a data packet that comprises a destination address;
   compare the destination address to at least one of the first address space and the second address space; and select a rule set for processing the data packet based on comparing the destination address.

9. The system of claim 4, wherein:
the system further comprises a VNET virtual machine that runs on a second host machine within the VNET; and
the network stack is configured to encapsulate a data packet that is destined for the VNET virtual machine to form an encapsulated data packet.

10. The system of claim 9, wherein:
the encapsulated data packet comprises a header and a payload;
the header of the encapsulated data packet comprises a header source address and a header destination address;
the hybrid virtual machine runs on a first host machine;
the header source address comprises a first physical IP address that is associated with the first host machine;
the header destination address comprises a second physical IP address that is associated with the second host machine; and
the payload of the encapsulated data packet comprises the data packet.

11. The system of claim 4, further comprising additional instructions that are executable by the one or more processors to:
migrate a plurality of non-VNET virtual machines to the VNET, wherein the plurality of non-VNET virtual machines maintain connectivity with the other non-VNET virtual machines during migration to the VNET; and
deploy a plurality of pure VNET virtual machines within the virtual network after the migration of the plurality of non-VNET virtual machines to the VNET.

12. The system of claim 11, wherein:
each non-VNET virtual machine is identified by a unique physical IP address; and
the plurality of pure VNET virtual machines are not individually associated with physical IP addresses.

13. A method, comprising:
creating a virtual network (VNET) that includes a VNET virtual machine that do not maintain a physical internet protocol (IP) address;
maintaining a non-VNET virtual machine having an existing physical IP address on a host machine, wherein the non-VNET virtual machine communicates with other non-VENT virtual machines via the existing physical IP address;
adding the non-VNET virtual machine having the existing physical IP address from the host machine to the VNET by assigning a VNET address to the non-VNET virtual machine while the non-VNET virtual machine maintains the existing physical IP address;
providing a network stack on the host machine with a first packet processing rule set and a second packet processing rule set, wherein the first packet processing rule set is configured to process first data packets from the non-VNET virtual machine corresponding to a first address space that has been defined for the virtual network, and wherein the second packet processing rule set is configured to process second data packets from the non-VNET virtual machine corresponding to a second address space that is distinct from the first address space and that does not overlap with the first address space; and migrating the non-VNET virtual machine to operate in a hybrid virtual state, wherein operating the migrated non-VNET virtual machine in the hybrid state enables the network stack on the host machine to utilize the provided first packet processing rule set when the non-VNET virtual machine communicates the first data packets with a previously migrated non-VNET virtual machine of a plurality of non-VNET virtual machines within the VNET and utilize the provided second packet processing rule set when the migrated non-VNET virtual machine communicates the second data packets with other non-VNET virtual machines of the plurality of non-VNET virtual machines outside of the VNET, wherein the second data packets includes the existing physical IP address, and wherein the first data packets includes the assigned VNET address.

14. The method of claim 13, wherein the migrated non-VNET virtual machine maintains connectivity with other non-VNET virtual machines during migration to the VNET which the hybrid virtual machine previously communicated with as the non-VNET virtual machine.

15. The method of claim 13, wherein:
the first packet processing rule set comprises encapsulation rules that specify how encapsulation should be performed on the first data packets; and
the second packet processing rule set permits the second data packets to be transmitted to the other non-VNET virtual machines without encapsulation.

16. The method of claim 13, wherein the VNET contains one or more pure VNET virtual machines within the VNET, and wherein the one or more pure VNET virtual machines has an assigned VNET address and do not maintain a physical IP address.

17. The method of claim 13, wherein the network stack is configured to:
receive a data packet that comprises a destination address;
compare the destination address to at least one of the first address space and the second address space; and
select a rule set for processing the data packet based on comparing the destination address.

18. The method of claim 13, further comprising a VNET virtual machine that runs on a second host machine within the VNET, and
wherein the network stack is configured to encapsulate a data packet that is destined for the VNET virtual machine to form an encapsulated data packet.

19. The method of claim 18, wherein:
the encapsulated data packet comprises a header and a payload;
the header of the encapsulated data packet comprises a header source address and a header destination address;
the hybrid virtual machine runs on a first host machine;
the header source address comprises a first physical IP address that is associated with the first host machine;
the header destination address comprises a second physical IP address that is associated with the second host machine; and
the payload of the encapsulated data packet comprises the data packet.

* * * * *